Nov. 1, 1966         H. H. UNFRIED         3,282,051
               FLUID DYNAMIC CONTROL DEVICE
Filed Feb. 4, 1965                    4 Sheets-Sheet 1
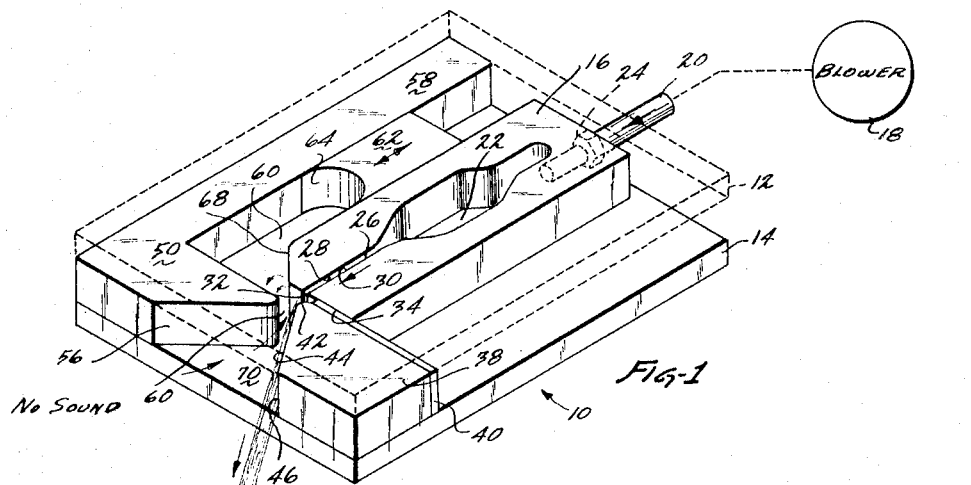
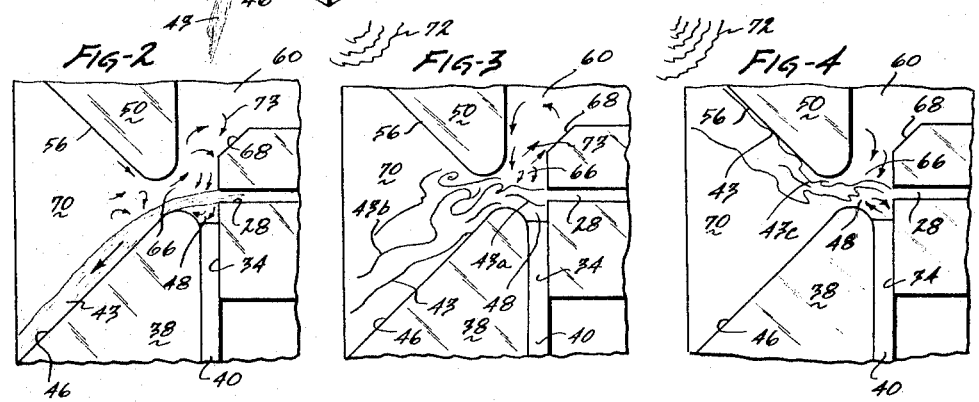
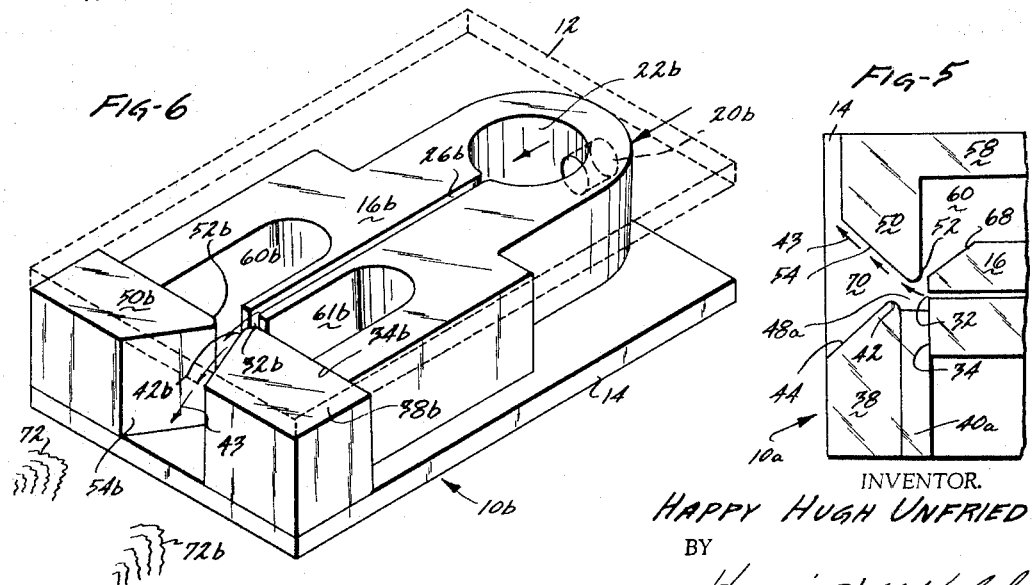
INVENTOR.
HAPPY HUGH UNFRIED
BY
Herzig & Walsh
ATTORNEYS

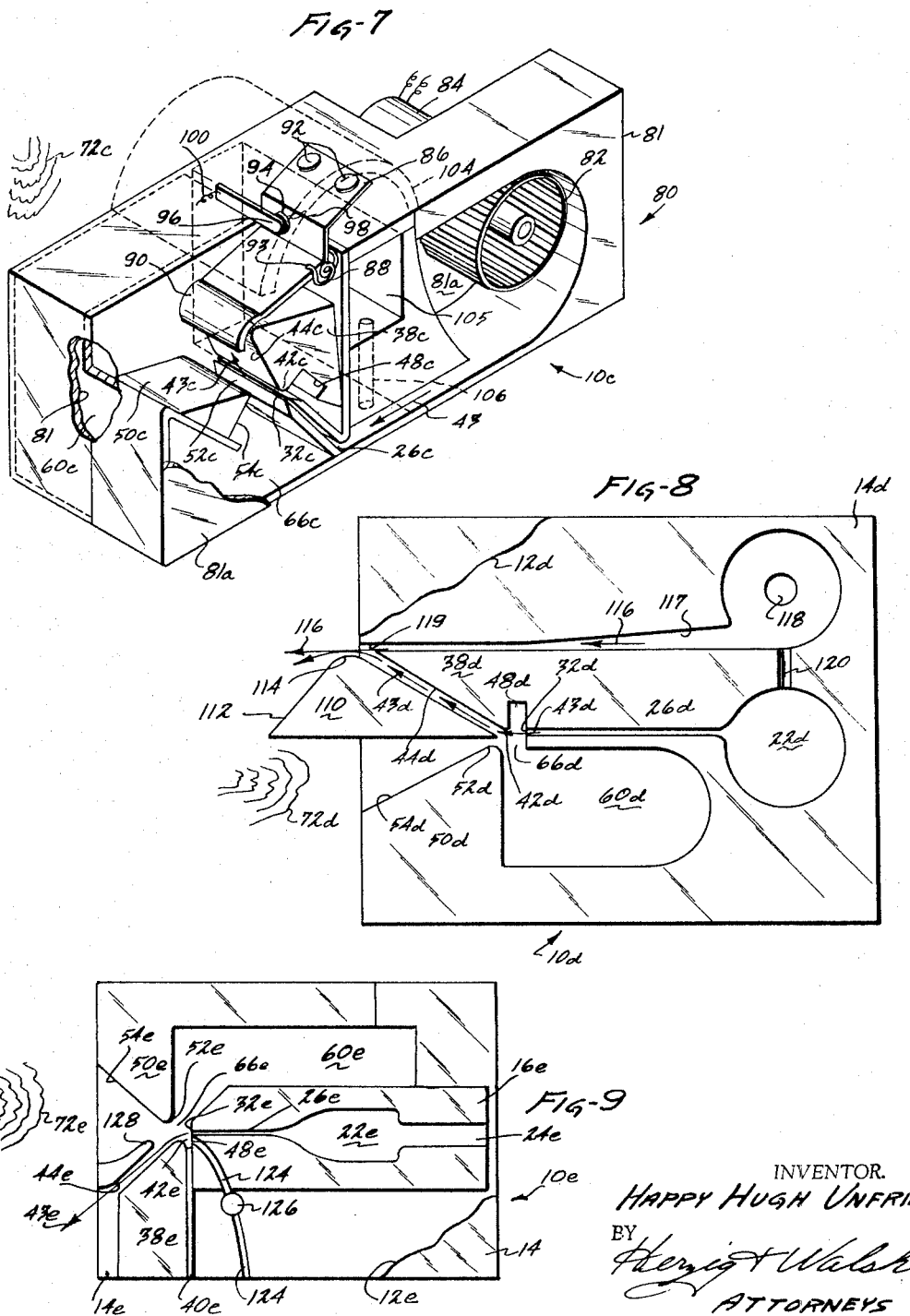

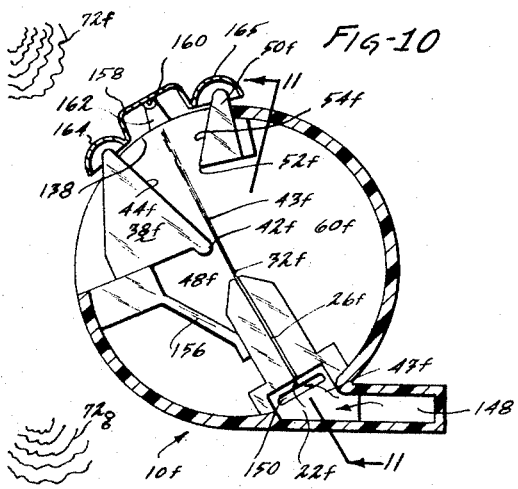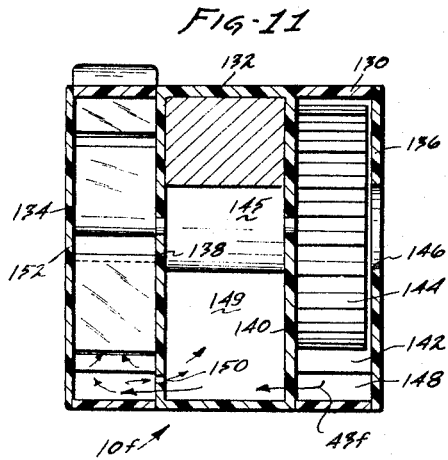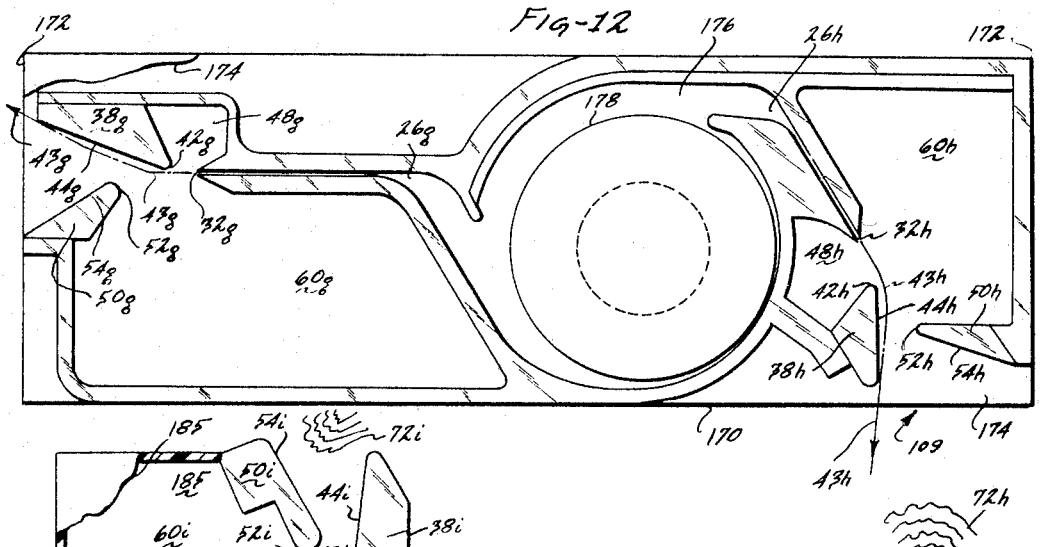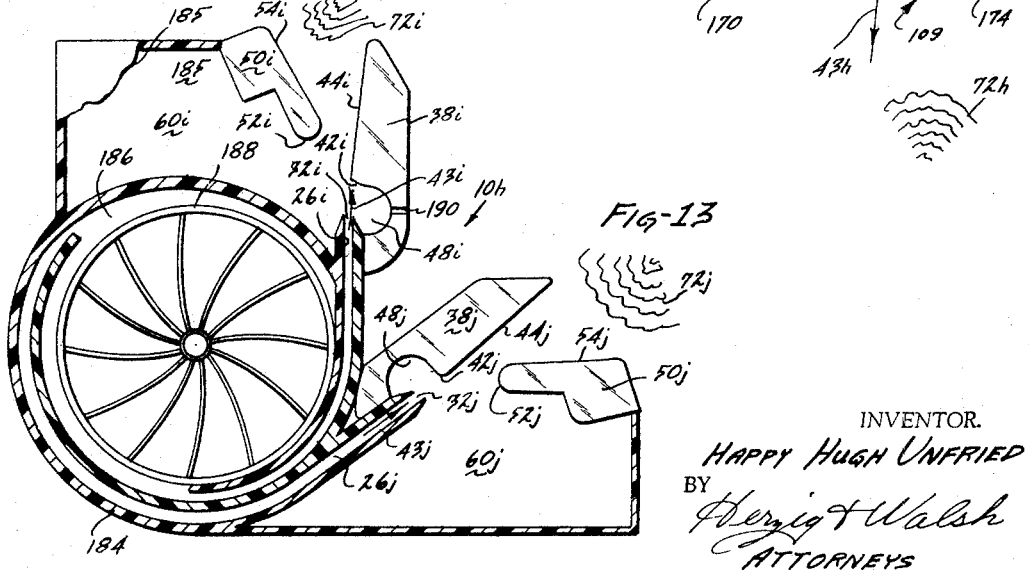

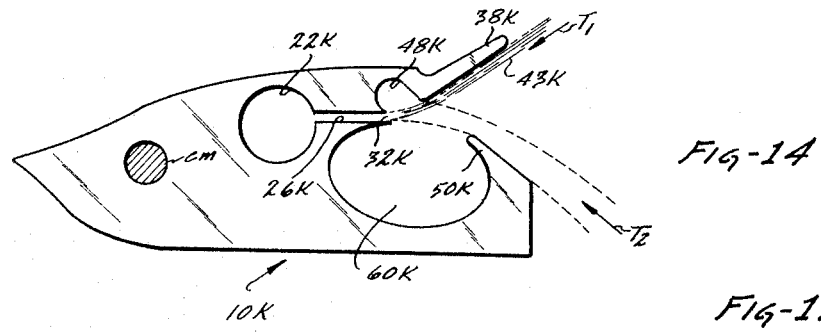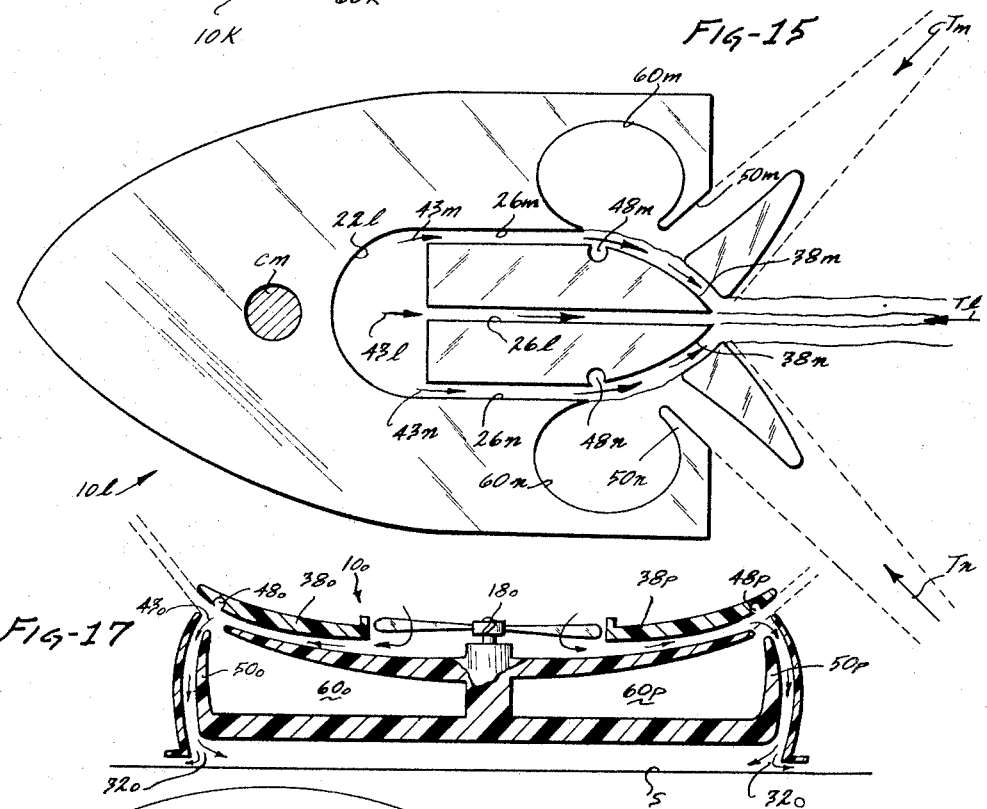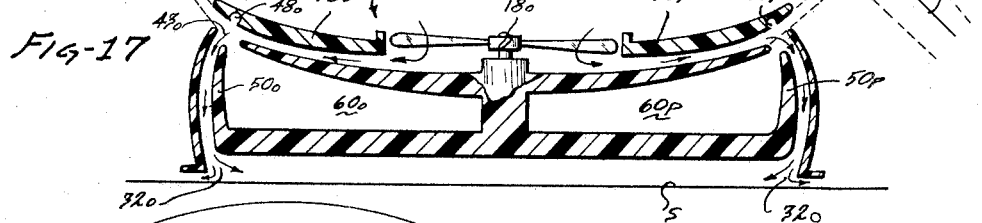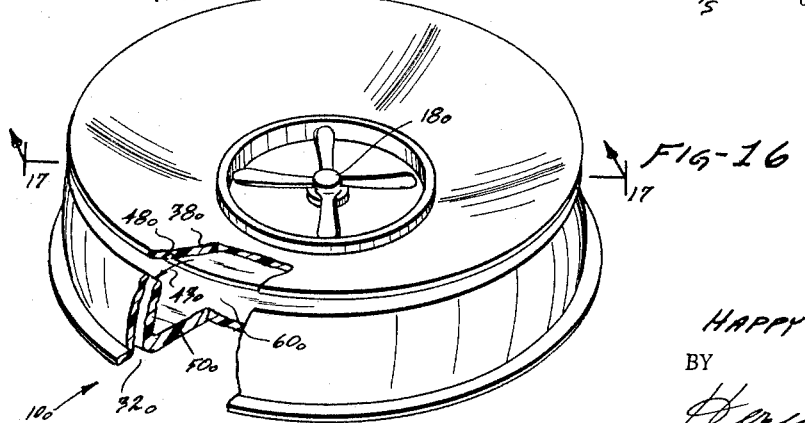

United States Patent Office 3,282,051
Patented Nov. 1, 1966

3,282,051
FLUID DYNAMIC CONTROL DEVICE
Happy Hugh Unfried, Los Angeles, Calif., assignor to Mattel, Inc., Hawthorne, Calif., a corporation of California
Filed Feb. 4, 1965, Ser. No. 430,427
44 Claims. (Cl. 60—230)

The present invention relates to a fluid dynamic control device, and more particularly to an acoustically activated fluid dynamic control device which may be used as a thrust vectoring device or to control the operation of electrical and mechanical devices.

Although prior art fluid dynamic control devices are known, they do have certain disadvantages.

A major disadvantage resides in the fact that the fluid jet employed in such prior art devices is comparatively stable to small disturbances, hence, the devices are relatively insensitive to low amplitude sound waves.

Another disadvantage resides in the fact that certain of these prior art devices do not lend themselves readily to controlling devices having more than a single operating mode.

A further disadvantage resides in the fact that they do not lend themselves readily to adjustment to compensate for changes in operating modes or parameters.

Yet another disadvantage resides in the fact that they require a secondary input having a net mass flow in the form of a fluid control stream.

In view of the foregoing factors and conditions characteristic of fluid dynamic control devices, it is a primary object of the present invention to provide a new and useful fluid dynamic control device not subject to the disadvantages enumerated above and having means for operating a fluid jet in the region of flow where it is most unstable to small disturbances so that it is sensitive to sound waves.

Another object to the present invention is to provide a device of the type described which includes means to augment the acoustic particle velocity in the vicinity of the jet orifice.

Yet another object of the present invention is to provide a device of the type described which includes an acoustic resonator having a resonant frequency corresponding to the characteristic frequency to which the fluid jet employed in the device is most sensitive.

A further object of the present invention is to provide a device of the type described having a nozzle exit including boundaries which are adjusted so that the jet is, in the undisturbed state, normally monostable on one boundary, and in the disturbed state, is conditionally stable on the opposite boundary.

A further object of the present invention is to provide a device of the type described which includes means to adjust its monostable operating point.

A still further object of the present invention is to provide an acoustically controlled thrust vectoring device.

Another object of the present invention is to provide a new and useful acoustically activated fluid dynamic control device which may be used to control the operation of electrical and mechanical devices.

Another object of the present invention is to provide a device of the type described which does not require a secondary input which has a net mass flow in the form of a fluid control stream.

According to the present invention, several embodiments of an acoustically activated fluid dynamic control device are provided which employ the general principle that the stable operating position of a fluid jet as it issues from an orifice in the presence of suitable boundaries can be changed by disturbing it acoustically.

The several embodiments of the device include means for operating a fluid jet in the region of flow where it is most unstable to small disturbances; hence, it is sensitive to sound waves with the appropriate orientation.

Although the stream flow direction can be altered by simply using a strong disturbing sound, it is preferable to increase the sensitivity of the device by incorporating an acoustic resonator into the device. The acoustic resonator augments the acoustic particle velocity in the vicinity of the jet orifice, and increases the frequency selectivity of the device. The resonant frequency of the resonator corresponds to the characteristic frequency at which the jet is most sensitive to small disturbances.

In addition, means are provided for controlling the boundary layer of the jet for improved directional control. The nozzle or orifice exit boundaries of the device are adjusted so that the jet is, in the undisturbed state, normally monostable on one boundary, and in the disturbed state, it is conditionally stable on the opposite boundary.

In addition, one embodiment includes a fluid biasing leak which is employed to control the stability of the fluid stream operating in its monostable region.

In yet another embodiment, a central fluid supply is employed to operate two or more control devices in the region of maximum instability, and such separate control devices can be operated simultaneously at different frequencies.

In a further embodiment of the present invention, a greater momentum of flow than can be controlled acoustically, such as a thrust producing jet for a vehicle, is held off a nozzle boundary by an acoustically controlled jet in the undisturbed stable state. When acoustically disturbed, the control jet switches positions and the power jet becomes attached to the nozzle boundary in such a manner that the device operates as a thrust vectoring device.

Another embodiment includes vane means which is actuated by the disturbed jet so that it is caused to rock about its pivot and perform useful work and in yet another embodiment, the curtain jet of a ground effect vehicle is altered acoustically. In all embodiments of the invention a fluid jet is acoustically controlled to, in turn, serve as a thrust vectoring device or to control other fluid flows, or electrical or mechanical devices and processes without using a secondary input which has a net mass flow in the form of a fluid control stream.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIGURE 1 is a perspective view of a first embodiment of an acoustically activated fluid dynamic control device of the present invention;

FIGURES 2, 3 and 4 are partial plan views, on an enlarged scale, of the device of FIGURE 1 showing somewhat diagrammatically the operation thereof;

FIGURE 5 is a plan view similar to FIGURE 3 showing a modification to the device of FIGURE 1;

FIGURE 6 is a perspective view of a second embodiment of an acoustically activated fluid dynamic control device of the present invention;

FIGURE 7 is a perspective view of yet another form of the present invention;

FIGURE 8 is a plan view of a thrust vectoring device constituting a fourth embodiment of the present invention;

FIGURE 9 is a plan view of another embodiment of the present invention;

FIGURE 10 is a transverse, cross-sectional view, with parts shown in elevation, of a fifth embodiment of the present invention;

FIGURE 11 is a cross-sectional view taken along line 11—11 of FIGURE 10;

FIGURE 12 is a plan view showing somewhat diagrammatically a sixth embodiment of the present invention;

FIGURE 13 is a cross-sectional view of a seventh embodiment of the present invention;

FIGURES 14 and 15 are plan views showing somewhat diagrammatically the application of the principles of the present invention to thrust vectoring and flight control;

FIGURE 16 is a perspective view of a ground effects vehicle of the present invention; and FIGURE 17 is an enlarged cross-sectional view taken along line 17—17 of FIGURE 16.

Referring again to the drawings and particularly to FIGURES 1–4 an acoustically activated fluid dynamic control device constituting a first embodiment of the present invention, generally designated 10, includes a first plate 12 (shown in phantom for clarity) and a second plate 14, forming suitable housing means.

A fluid storage and dispensing member 16 is rigidly mounted in the housing means formed by the plates 12 and 14 and is adapted to receive a suitable fluid, such as air under pressure from a blower 18 through a fluid inlet conduit 20. Other fluids, such as water, can be employed. The relationships of jet velocity, jet thickness and frequency, for the same geometry of boundary layers, will of course vary with changes in the viscosity of the fluid employed; but the invention defined herein is equally applicable to all practical fluids. The member 16 includes an accumulator chamber 22 which communicates with the conduit 20 through a suitable fitting 24. Fluid accumulating in the chamber 22 is exhausted therefrom through a passageway or channel 26 having parallel or nearly parallel, spaced sidewalls 28 and 30 terminating in a channel exit or orifice 32 provided in one end 34 of member 16. The passageway or channel 26 is preferably of sufficient length to insure that a laminar flow is imparted to the fluid leaving chamber 22 before it reaches the channel exit or orifice 32. Although a number of different dimensions for the member 16 will manifest themselves, it has been found satisfactory to make the depth of the channel 26 approximately ten times its width and to make its length approximately 20 times its width. Thus, the channel 26 and orifice 32 should produce a plane jet and not a round jet with the preferred aspect ratio of the jet having a ratio greater than 5 to 1.

Suitable means, such as a nozzle block or boundary 38, is mounted between the plates 12 and 14 adjacent the end 34 of member 16. The block 38 is spaced a suitable distance downstream of the channel exit 32 by any suitable means, such as a shim 40. The block 38 also includes a portion 42 which lies laterally adjacent a jet or stream 43 issuing from the channel exit 32. The block 38 also includes a flat, oblique face 44 which extends the laterally adjacent portion 42 and connects it to a downstream portion 46. The shim 40 may be made somewhat shorter than the block 38 or other suitable means (not shown) may be used, to form a separating means, chamber 48, between the portion 42 of the block 38 and the end 34 of the member 16.

A second boundary means or nozzle block 50 is mounted between plates 12 and 14 downstream of the channel exit 32. This second nozzle block 50 also includes a portion 52 which lies laterally adjacent the fluid stream 43 issuing from the channel exit 32 and which is joined by a flat face 54 to a downstream portion 56. The laterally adjacent portion 52 also lies slightly downstream of the corresponding portion 42 on the block 38. The block 50 is formed integrally with an elongated member 58 which is preferably slidably mounted between corresponding edges of the plates 12 and 14 in spaced relation with the member 16 so that a chamber or resonator 60 is formed therebetween. The size of the chamber 60 may be controlled by a slidable block 62 which is reciprocally mounted between the member 16 and the member 58 and which includes a concaved end 64 forming an endwall for the chamber 60. The chamber 60 is in fluid communication with the channel exit 32 through a throat or neck member 66 which is formed by the portion 52 of block 50 and an oblique, flat face 68 provided on end 34 of the member 16.

The chamber 60 and the throat 66 form a suitable resonant means, such as an acoustic resonator of the Helmholtz type, which may be tuned to a predetermined frequency by shifting the member 62. Of course, it will be apparent to those skilled in the art that a resonant tube or diaphragm may be substituted for the acoustic resonator means herein shown and described, if desired. It should also be noted that the resonator can be eliminated if it is desired to employ a higher amplitude sound disturbance for the control. Preferably, however, a resonator is used so that a disturbing sound of small magnitude will be effective to operate the device in a manner to be hereinafter described.

The nozzle exit boundaries 38 and 50 are preferably adjusted so that the jet or stream issuing from the channel exit 32 in the undisturbed state is normally monostable on the boundary 38 and in the disturbed state is conditionally stable on the opposite boundary 50. On the other hand, if the secondary boundary 50 is very nearly as close to the channel exit 32 and the direction of flow of the stream 43 as the boundary 38—i.e., if the adjustment of the device 10 is very fine—the switching will be irreversible.

The jet 43 issuing from channel exit 32 is operated in the region of flow where it is most unstable to small disturbances; hence the jet is sensitive to sound waves which have the appropriate orientation and frequency.

The acoustic resonator chamber 60 is employed to increase the frequency selectivity of the device 10 beyond that which is obtainable by merely operating a jet in its free state in the region of flow where it is most unstable to small disturbances. The resonator augments the acoustic particle velocity in the vicinity of the orifice 32. The resonator chamber 60 is tuned to a frequency which corresponds to the characteristic frequency to which the jet 43 issuing from channel exit 32 is most sensitive.

The device 10 may be made from any suitable material such as metal, synthetic resin, plastic or the like. Preferably, the walls of the chamber 60 are rigid and not compliant because the selectivity of the device 10 decreases as the compliance of the walls of chamber 60 increases.

In use, a suitable fluid under pressure, such as air or water, is supplied by the blower 18 to the accumulator 22 through conduit 20. Fluid from the accumulator 22 then flows through the channel 26 attaining a laminar flow before reaching the channel exit 32. Since this laminar flow issues from the channel exit 32 into a stagnant medium represented by the ambient atmosphere existing in the region 70 between the blocks 38 and 50, the jet or stream 43 will attach itself to the laterally adjacent portion 42 of block 38 and remain attached to the block 38 along the face 44 between the portions 42 and 46. The manner in which the stream 43 becomes attached to the boundary 44 is accomplished as follows:

The stream initially issues from the orifice 32 and enters the stagnant medium at 70. Due to viscous drag, the fluid along the boundaries of the stream is entrained and carried along with the stream. Thus, a secondary flow is established on both sides of the free stream. Portion 42 is sufficiently close to the boundary of the free stream so that the secondary flow from 70 cannot enter the separating means or small chamber 48 to replenish the fluid which was entrained and exhausted. Therefore, the pressure in chamber 48 is reduced below the pressure in the throat 66 and the stagnant area 70 so that the resulting pressure gradient across the stream deflects it toward portion 42. This same sequence of events is repeated until the stream is fully attached to the boundary 44.

As long as the jet or stream 43 remains in the laminar state, it will remain attached to boundary 44. Boundary 54 is sufficiently spaced from the channel exit 32 and the center line of the jet so that, if the jet were manually placed along the boundary 54, it would return to its stable state along the boundary 44. Thus, the stream in its undisturbed state is monostable. However, it is just barely in the monostable state and very close to the region of flow where it would become bistable.

The acoustic resonator means is tuned to the frequency at which it is desired to switch the jet or stream 43. When the chamber or resonator 60 is excited at resonance, the acoustic particle motion in the neck 66 interacts with the stream issuing from the channel exit 32 and produces undulations in the distribution of the vorticity of the stream. These undulations are basically unstable and as they are convected downstream they grow into sizeable vortices. The chamber 60 is excited at resonance by a suitable disturbance which drives resonator 60 at resonance and which may comprise a suitable vibratory flow in a fluid, such as the sound illustrated diagrammatically at 72 in FIGURES 3 and 4. As the sound 72 disturbs the jet, a well developed vortex flow is produced which increases the entrainment on both sides of the stream 43, but predominantly on the side of the jet 43 adjacent throat 66, as shown by arrows 73 in FIGURE 2.

The pressure in the chamber 48 is further reduced and the jet 43 bends into the chamber 48 slightly, as shown in FIGURE 3 at 43a. Then the vigorous vortex flow past the portion 42 plus the increased centrifugal force of the jet 43 in the region of the portion 42 cause flow separation (43b, FIGURE 3) to ensue along boundary 44 freeing the jet 43 therefrom. Simultaneously, the increased entrainment in the region of the throat 66 (arrows 73a in FIGURE 3) resulting from the well developed vortex flow and the effective increase in the stream width tend to reduce the secondary flow entering region 66 from the atmosphere at 70. This allows the pressure gradient from region 70 to throat 66 to bend the jet 43 down to portion 52 of boundary 50 (as at 43c in FIGURE 4) until the flow attaches to the face 54 (as the vortex flow develops and is convected downstream, it reduces the available passage for the secondary flow from region 70 to throat 66; therefore, the pressure regenerative Coanda Effect commences and the stream switches to face 54 of boundary 50). The stream remains attached to face 54 as long as the periodic, acoustic disturbance continues. When the disturbance ceases, by terminating sound 72, the jet 43 again assumes a laminar flow and returns to its monostable state along the face 44 of boundary 38.

As is well known, the transition from laminar to turbulent flow is an inherent characteristic of boundary layer and free jet fluid flows as the Reynolds number increases. The magnitude of turbulence at any location can be considered to be an amplification of a disturbance which previously occurred upstream and which is the internal noise level of a free jet not externally excited. The phenomenon which makes the transition from the laminar flow to turbulent flow possible is employed in the device 10, but is controlled in such a manner that a well developed, periodic vortex flow takes place instead of a turbulent flow.

An acoustic disturbance created by the sound 72 transforms a vortex sheet comprised of microscopic eddies into a vortex flow where the little eddies comprise a macroscopic vortex. However, the jet 43 is not unstable to disturbances of all frequencies so that the problem connected with shock and vibration being transmitted to the stream 43 at the channel exit 32 is minimized. The region where the jet 43 is most unstable corresponds to the case where the ratio of jet thickness at the channel exit 32 to the flow wave length is from about 0.1 to 1.0. In actual practice, a ratio of between 0.2 and 0.4 has been found to be satisfactory. As hereinbefore noted, the resonator 60 can be eliminated by employing a very strong disturbing sound.

The jet or stream 43 may be employed to produce work by exerting a force against a suitable medium such as the surrounding atmosphere, an electrical contact, a mechanical device or other fluid jets or by the mass displacement of the material being forced out by the jet. Thus, it is apparent that the device 10 can be employed to acoustically control the direction along which a jet stream can be caused to travel to exert a force in the form of work.

The device shown in FIGURES 1–4 is shown in modified form in FIGURE 5 as comprising a control device 10a which is substantially similar to the device 10 except that a thicker shim 40a is positioned between the end 34 and the nozzle block 38 to maintain it further down stream of the channel exit 32. This creates a larger chamber 48a.

In addition, the nozzle block 50 and its integral leg 58 have been repositioned on plate 14 in such a manner that the portion 52 of block 50 is positioned nearer to the channel exit 32 than in the FIGURE 1 embodiment. Thus, the portion 52 in the FIGURE 5 embodiment lies upstream of the portion 42 instead of lying downstream thereof, as was the case in the FIGURE 1 embodiment. With this configuration, the jet stream 43 attaches to the boundary 54 in its undisturbed condition and becomes attached to the boundary 44 when it is acoustically disturbed. In practice, it has been found that the FIGURE 1 embodiment and the FIGURE 5 embodiment have approximately the same sensitivity although the FIGURE 5 embodiment is somewhat more difficult to control over larger ranges of stream velocity due to its greater susceptibilty to oscillation. The FIGURE 5 embodiment offers a geometry of the nozzle which allows a more effective manner of distributing the stream 43, but this asset is balanced by the result that the acoustic resonance is more highly damped for this nozzle geometry as compared to the FIGURE 1 embodiment.

Referring now to FIGURE 6, a third embodiment of the present invention, generally designated 10b, includes a base plate 14 and a cover plate 12 between which an integral accumulator, nozzle and resonator assembly 16b is mounted. The assembly 16b includes an accumulator 22b which may be filled with a suitable fluid under pressure, such as air or water, through a fluid inlet 20. A channel 26b places the accumulator 22b in fluid communication with the channel exit 32b. The channel 26b is designed to assure that the flow of fluid from accumulator 22b becomes laminar before it reaches the channel exit 32b and the channel 26b preferably has a width to breadth ratio greater than 5 to 1.

The member 16b also includes a first resonator chamber 60b and a separating means in the form of a second resonator chamber 61b. A first nozzle block 38b is mounted between plates 12 and 14 across the end 34b of member 16b. The block 38b defines boundary means having a portion 42b laterally adjacent a jet 43 issuing from the nozzle 32b. The block 38b also includes an oblique face 44b.

A second nozzle block 50b is mounted between plates 12 and 14 across the end 34b and the resonator chamber 60b. The block 50b includes a portion 52b and an oblique face 54b. The portion 52b of block 50 lies further downstream than the portion 42b of block 38b so that the flow 43, in its undisturbed condition, will become attached to the face 44b. Then when the flow 43 is acoustically disturbed, it becomes attached to the face 54 of block 50b, and when the disturbance is ceased the stream 43 returns to its initial position along face 44b.

In the FIGURE 6 embodiment, a pair of resonators 60b and 61b are employed so that the stream 43 can be switched at two different sound frequencies 72 and 72b, respectively.

A fourth embodiment of the present invention, generally designated 10c, is shown in FIGURE 7 as including a housing assembly 80 having end walls 81 and sidewalls 81a. A blower 82 is mounted in housing 80 and is powered by an electric motor 84. The blower 82 supplies air under pressure to the channel exit 32c througs a passageway 26c.

A first nozzle block 38c is also mounted in housing 80 defining a boundary 44c having a portion 42c laterally adjacent the channel exit 32c. The nozzle block 38c includes a recessed portion 48c forming a separating means or chamber which corresponds to and performs the same function as the chamber 48 in the FIGURE 1 embodiment. A second nozzle block 50c forms a boundary 54c having a portion 52c laterally adjacent the channel exit 32c somewhat downstream of the corresponding portion 42c on nozzle block 38c. A resonator chamber 60c is provided in housing 80 and includes a throat 66c which is in fluid communication with channel exit 32c and chamber 48c.

A vane means 86 is rockably mounted on housing 80 by a pin 88 and includes a cupped portion 90 extending over the boundary 44c in the path of flow of a stream 43 issuing from channel exit 32c. The vane means 86 also includes a pair of counterweights 92 which statically balance the vane means 86. A spring 93 biases the cupped portion 90 toward nozzle block 38c to return the vane means 86 to its normal position when the stream 43 is not present.

When blower 82 is energized, the flow of fluid from the channel exit 32c attaches to the boundary 44c and flows into engagement with the cupped portion or member 90 creating sufficient force to rock the vane means 86 about pivot 88 in a clockwise direction.

When a suitable sound, indicated diagrammatically at 72, drives the chamber 60c at resonance, the sound disturbs the stream issuing from channel exit 32c and causes it to become attached to the boundary 43c so that the stream no longer engages cupped member 90. The vane means 86 will rotate in a counter clockwise direction bringing an electrical contact 94 carried thereby into engagement with an electrical contact 96. The electrical contacts 94 and 96 may be connected in a suitable electric circuit through leads 98 and 100, respectively, to a device not shown, to be controlled by the device 10c.

Of course, it is obvious that the vane means 86 may be provided with a number of different types of mechanical linkages for use in controlling the operation of mechanical devices. The vane means 86 and the electrical contacts 94 and 96 may be covered by a suitable cover member, such as the one shown in phantom lines at 104. Since the sound from blower 82 could disturb stream 43, a suitable filter is provided in the device 10c to attenuate the blower sound in a frequency band near the resonant frequency of chamber 60c. The filter comprises a chamber 105 and a neck 106. The neck 106 shunts the blower sound from channel 26c into chamber 105 where it is absorbed. The chamber 105 may be filled with a suitable sound absorbing material or it may be left empty.

The embodiment of the present invention which is shown in FIGURE 8 constitutes a thrust vectoring device 10d which includes an accumulator 22d which is mounted between plates 12d and 14d and which communicates through a passageway 26d with first channel exit 32d, a small chamber 48d and the throat 66d of a resonator 60d. The device 10d also includes a first nozzle block 38d forming a boundary 44d having a portion 42d laterally adjacent a control jet stream 43d which issues from the nozzle 32d when the accumulator 22d is pressurized. A second nozzle block 50d is also mounted downstream of the channel exit 32d forming a boundary 54d having a portion 52d laterally adjacent the control jet stream 43d.

A third nozzle block or wedge 110 is also provided downstream of the channel exit 32d and includes a boundary 112 having a portion 114 laterally adjacent a power jet 116 supplied through a passageway 117 by a suitable power source indicated diagrammatically at 118. A conduit 120 connects the source 118 with the accumulator 22d for supplying fluid under pressure thereto. The power jet 116 discharges through a second channel exit 119 provided at the end of passageway 117 to impart thrust to a vehicle being powered by the device 10d.

The power jet 116 is held off the boundary 112 by the control jet 43d when in the undisturbed stable state. When acoustically disturbed by means which will drive the resonant chamber 60d at resonance, such as a sound indicated diagrammatically at 72d, the control jet 43d switches positions and becomes attached to the boundary 54d. The power jet 116 then becomes attached to the boundary 112 changing the direction of thrust produced by the power jet 116. When incorporated into a toy, a vehicle or other suitable device, not shown, the thrust vectoring device 10d may be employed as a remote control device to acoustically control the direction of movement thereof. In addition, either the power jet 116 or the control jet 43d, or both can be employed to perform work on a vane means of the type disclosed in FIGURE 7 or the like.

Referring now to FIGURE 9, a sixth embodiment of the present invention, generally designated 10e, includes plates 12e and 14e between which a member 16e is mounted. The member 16e includes an accumulator 22e to which a suitable fluid under pressure may be supplied through a fluid inlet 24e. A passageway 26e places the accumulator 22e in fluid communication with the channel exit 32e, a chamber 48e and the throat 66e of a resonator 60e. A shim 40e maintains a nozzle block 38e in position downstream of the channel exit 32e. The nozzle block 38e includes a boundary 44e having a portion 42e lying adjacent a jet stream 43e. A bleed passageway 124, which is controlled by a valve 126, is provided in the plate 14e for the leakage of fluid into the separating means or chamber 48e. The purpose of this fluid passageway and valve, is to allow fine control for the adjustment of the stream at its monostable operating point.

A second nozzle block 50e is mounted downstream of both the channel exit 32e and the portion 42e and includes a boundary 54e having a portion 52e laterally adjacent jet 43e. A suitable wedge 128 is positioned downstream of the channel exit 32e to direct the flow 43e along the boundary 44e. The stability of the stream 43e operating in the monostable region is controlled by the valve 126. Increasing the flow resistance of the leak through the passageway 124 is equivalent to changing the inclination angle of the boundary 44e or changing the distance from the boundary 44e to the centerline of channel 26. Thus, the leakage of fluid through the passageway 124 is effectively a low pass filter and does not influence the acoustical properties of the system. The stream 43e can be switched from the boundary 44e to the boundary 54e by a sound 72 in the same manner as described in connection with the FIGURE 1 embodiment.

Referring now to FIGURES 10 and 11, a seventh embodiment of the present invention, generally designated 10f, includes a housing 130 having a partially encompassing sidewall 132, first and second endwalls 134 and 136 and a pair of spaced, parallel interior partitions 138 and 140. The endwall 136 and the interior partition 140 form a fan chamber 142 in which a blower 144 is rotatably mounted. Upon rotation by a motor 145, the blower 144 draws air in through an opening 146 provided in the endwall 136. The blower 144 discharges into a duct 148 which conveys the air to a passageway 26f communicating with the channel exit 32f. The duct 148 is also in communication with an acoustical filter chamber 149 through an aperture 150 provided in the partition 138.

The endwall 134 and the partition 138 define a compartment 152 in which the channel exit 32f, a first nozzle blocking member 38f and a second blocking member 50f are mounted. The sidewalls 134 and 138 as well as housing 130 form a resonator chamber 60f.

The nozzle block 38f includes the usual boundary wall 44f having a portion 42f laterally adjacent a jet stream 43f issuing from the channel exit 32f. Also, the nozzle block 50f includes a boundary 54f having a portion 52f laterally adjacent the jet stream 43f and lying downstream of the portion 42f. A plate member 156 is also mounted in the chamber 152 to form a separation means or chamber 48f between the channel exit 32f and the portion 42f.

The device 10f may be used to control the operation of a suitable mechanical device, such as the vane means 158 which is pivotally mounted on the partition 138 by a pin 160 and a supporting member 162. The vane means 158 includes semi-cylindrical portions 164 and 165 which extend over the boundaries 44f and 54f, respectively, in the path of flow of the fluid 43f when it is attached to the respective boundaries 44f and 54f. The vane means 158 is statically and dynamically balanced and may be rocked in a counter clockwise direction, as viewed in FIGURE 10, by stream 43f when it is attached to the boundary 54f. The vane means is rocked in a clockwise direction by stream 43f when it is attached to boundary 44f. Thus, the vane means 158 can be caused to teeter back and forth on support 162 by subjecting stream 43f to a sound 72f cyclically.

The embodiments of the present invention shown in FIGURES 12 and 13 illustrate that single blower may be advantageously used to supply fluid to a plurality of channels having a number of different locations.

The device shown in FIGURE 12, generally designated 10g, includes a housing 170 having endwalls 172 and sidewalls 174. A blower chamber 176 is provided in the housing 170. A blower 178 is rotatably mounted in the blower chamber 176 for supplying a suitable fluid, such as air or water, under pressure to a first channel 26g provided in the rear portion of housing 170 and a second channel 26h provided in the front portion thereof. The air exits from channel 26g through the channel exit 32g and from channel 26h through the channel exit 32h. A blocking member 38g is mounted in housing 170 downstream of the nozzle 32g and includes a boundary wall 44g having a portion 42g laterally adjacent a jet stream 43g which issues from channel exit 32g when blower 178 is energized. A separation means or chamber 48g and a resonant chamber 60g are also provided in the rear portion of housing 170.

Energization of blower 178 also causes a jet stream 43h to exit from channel exit 32h and attach to the boundary wall 44h of a nozzle block 38h having a laterally adjacent portion 42h located downstream of channel exit 32h in the front portion of housing 170. A resonant chamber 60h, a separation means 48h and a nozzle block 50h are also provided in the front portion of the housing 170. A sound 72h, which drives the chamber 60h into resonance, may then be employed to switch the stream 43h from boundary wall 44h to a boundary wall 54h on block 50h having a laterally adjacent portion 52h. The chambers 60g and 60h may be tuned to different frequencies if desired. The jet streams 43g and 43h may be switched to perform various work functions. While many uses for the device 10g will manifest themselves, it may be advantageously used to propel and control the direction of movement of a ground effect vehicle.

Referring now to FIGURE 13, a fluid dynamic control device, generally designated 10h, includes a housing 184 having sidewalls 185 between which a first resonant chamber 60i and a second resonant chamber 60j are provided. A blower chamber 186 is also provided in the housing 184 in which a fan or blower 188 is rotatably mounted. Upon energization, the blower 188 simultaneously supplies air under pressure to a first channel 26i and a second channel 26j which are also provided in the housing 184. Air leaves the channels 26i and 26j through channel exits 32i and 32j respectively, and attaches to the boundary walls 44i and 44j of nozzle blocks 38i and 38j, respectively. The nozzle blocks 38i and 38j have laterally adjacent portions 42i and 42j, respectively, which are located downstream of their associated channel exits. The nozzle blocks 38i and 38j include suitable separating means 48i and 48j, respectively, and a passageway 190 is provided in the nozzle block 38i to provide a biasing means for controlling the pressure in chamber 48i.

A first sound 72i having a frequency which drives the chamber 60i into resonance may be used to switch the first stream 43i from the nozzle block 38i to a nozzle block 50i having a boundary wall 54i and a laterally adjacent portion 52i which is located downstream of the portion 42i. A second sound 72j, which may have a different frequency than the sound 72i, if desired, and which drives resonant chamber 60j into resonance, may be employed to switch a second stream 43j from the block 38j to a nozzle block 50j having a boundary wall 54j and a laterally adjacent portion 52j which lies downstream of the portion 42j. It is to be noted that when the stream 43i is attached to nozzle block 38i and the stream 43j is attached to nozzle block 50j, right angle forces will be applied to housing 184.

Referring now to FIGURE 14, a fluid control device 10k includes a fluid supply chamber 22k, a channel 26k, a channel exit 32k, a separating means 48k and a resonator 60k. The device 10k may be employed as a thrust vectoring device having a set line of thrust $T_1$ created by a jet stream 43k which may be switched acoustically to a set line of thrust $T_2$ for flight control.

It is known that "thrust" produced by a jet is not solely a matter of pushing on a surface or material against which the jet is directed. An essential feature of thrust is that it arises from a mass displacement of the material being forced out by the jet—regardless of any medium, or lack of it, into which or against which the jet is being forced. Thus, the thrust derived from the expulsion of mass by the jet 43k may be considered as providing a force and an associated couple applied at the center of mass cm of the device 10k. By changing the line of action of the thrust vector $T_1$ acoustically from the boundary 38k to the boundary 50k in the manner described in connection with the FIGURE 1 embodiment of the present invention, the magnitude of the force remains unchanged, but its direction and the magnitude of the couple change. Hence, flight control of the device 10k is obtained.

Another example of flight control is illustrated in FIGURE 15 wherein a fluid control device 10L includes a center of mass cm, a fluid supply chamber 22L, a plurality of channels 26L, 26m and 26n and separating means 48m and 48n. Three fixed lines of thrust $T_L$, $T_m$ and $T_n$ are established by jet streams 43L, 43m and 43n which emanate from the fluid supply chamber 22L. The jet streams 43m and 43n are normally attached to the boundaries 38m and 38n, respectively, along which they flow to a common point of discharge with the jet stream 43L to create a thrust vector $T_L$ through the center of mass cm. The device 10L also includes a first resonator 60m which may be driven into resonance acoustically to switch the jet stream 43m to the boundary 50m causing the line of thrust $T_m$ to create a first couple which is applied at the center of mass cm. The device 10L also includes a second resonator 60n which may be driven into resonance acoustically to switch the jet stream 43n from the boundary 38n to the boundary 50n causing the line of thrust $T_n$ to create a second couple which is applied at the center of mass cm. Thus, the device 10L provides a device which has three fixed lines of thrust and which operates substantially the same as the previously described devices.

Yet another example of flight control is illustrated in FIGURES 16 and 17 wherein an air cushion vehicle 10o includes a power plant 18o for supplying a curtain jet 43o which discharges through a peripheral nozzle 32o around the circumference of the vehicle 10o. The vehicle 10o also includes resonators 60o and 60p, boundaries 50o and 50p, separating means 48o and 48p and boundaries 38o and 38p. The curtain jet 43o which is directed against a relatively solid surface to support the vehicle 10o thereabove may be altered acoustically to create low pressure and high pressure areas as the jet is deflected from the surface S to effect a "thrust" in a particular direction. The curtain jet 43o is normally attached to boundaries 50o and 50p. When resonator 60o is driven into resonance, a segment of the jet 43o switches to the boundary 38o removing this segment of the jet from surface S, thereby creating a low-pressure area in the vicinity of the removed segment. This gives the vehicle 10o a thrust component in the direction of the low-pressure area. When the resonator 60p is driven into resonance, another segment of the jet 43o is removed from the surface S giving the vehicle 10o a thrust component in another direction.

While the particular fluid dynamic control devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. A fluid dynamic controlled device, comprising:
   fluid-stream-forming means for forming a stream of fluid;
   first boundary means laterally adjacent one side of said stream;
   second boundary means laterally adjacent the other side of said stream, said second boundary means being generally opposite and downstream of said first boundary means;
   separating means adjacent to and upstream of said first boundary means for creating a pressure gradient across said stream in a direction to deflect it onto said first boundary means; and
   vibratory means for directing a vibratory flow of fluid at said stream adjacent said separating means to disturb said stream in such a manner that the pressure adjacent said second boundary means is reduced whereby the direction of said pressure gradient is reversed across said stream to switch said stream from said first boundary means to said second boundary means.

2. A device as defined in claim 1 wherein said stream returns to said first boundary means when said vibratory flow of fluid is removed.

3. A device as defined in claim 1 including vane means downstream of said boundary means in the path of flow of said stream when it is flowing along one of said boundary means for actuation thereby.

4. A device as defined in claim 1 wherein said stream-forming means includes channel means having substantially parallel spaced sidewalls for producing a plane stream with an aspect ratio greater than 5 to 1.

5. A device as defined in claim 1 including resonator means in communication with said stream generally opposite said separating means, said resonator means being driven into resonance by said vibratory means.

6. A device as defined in claim 4 wherein said stream-forming means includes an accumulator in fluid communication with said channel means for supplying fluid thereto to produce said stream.

7. A device as defined in claim 5 wherein said separating means comprises a second resonator means.

8. A device as defined in claim 1 including bleed passageway means in fluid communication with said separating means.

9. A device as defined in claim 1 including wedge means positioned between said boundary means for directing said stream along said boundary means.

10. A device as defined in claim 9 including means forming a power jet adjacent said wedge means, said power jet being held off said wedge means by said fluid stream when it is flowing along said first boundary means, said wedge means including third boundary means along which said power jet flows when said fluid stream is switched from said first boundary means to said second boundary means.

11. A device as defined in claim 3 wherein said vane means is mounted in the path of flow of said fluid stream for actuation thereby when said fluid stream is flowing along either of said boundary means.

12. A fluid dynamic device, comprising:
    housing means;
    an accumulator chamber provided in said housing means for storing a fluid under pressure therein;
    conduit means connecting said accumulator chamber to a source of fluid under pressure;
    channel means in fluid communication with said accumulator chamber, said channel means including substantially parallel, spaced sidewalls, the end of said channel means which is remote from said accumulator chamber forming an exit orifice, the depth of said channel being approximately ten times its width and the length of said channel being approximately 20 times its width, whereby a laminar flow is imparted to said fluid leaving said accumulator chamber before it reaches said exit orifice, said fluid leaving said orifice in a plane stream, the aspect ratio of said plane stream being greater than 5 to 1;
    first boundary means mounted in said housing downstream of said exit orifice, said first boundary means including a first laterally adjacent portion which lies laterally adjacent one side of said stream and an oblique face connecting said first laterally adjacent portion to a downstream portion of said first boundary means;
    spacer means mounted in said housing between first boundary means and said exit orifice for forming a separating chamber between said first laterally adjacent portion and said exit orifice for creating a pressure gradient across said stream in a first direction, whereby said stream attaches to said first boundary means;
    second boundary means mounted in said housing, said second boundary means including a second laterally adjacent portion which lies laterally adjacent the other side of said stream downstream of said first laterally adjacent portion, said second boundary means also including an oblique face connecting said second laterally adjacent portion to a downstream portion;
    a resonator mounted in said housing in fluid communication with said separating chamber between said second laterally adjacent portion and said exit orifice; and
    sound means for driving said resonator into resonance to disturb said stream in such a manner that the ambient pressure adjacent said second boundary means is reduced whereby the direction of said pressure gradient is reversed across said stream to switch said stream from said first boundary means to said second boundary means.

13. A device as defined in claim 12 wherein said stream returns to said first boundary means when the disturbance created by said sound means is removed.

14. A device as defined in claim 12 wherein said second boundary means lies upstream of said first boundary means.

15. A device as defined in claim 12 wherein said separating chamber comprises a resonator chamber.

16. A device as defined in claim 12 including wedge means mounted in said housing intermediate said first and second boundary means downstream of said first and second laterally adjacent portions for directing said stream along said boundary means.

17. A device as defined in claim 16 including means forming a power jet adjacent said wedge means, said power jet being held off of said wedge means by said stream when it is flowing along said first boundary means, said wedge means including third boundary means along which said power jet flows when said stream is switched from said first boundary means to said second boundary means.

18. A device as defined in claim 17 wherein said stream returns to said first boundary means when the disturbance created by said sound means is removed.

19. A device as defined in claim 17 including blower means mounted in said housing means for supplying fluid to said accumulator and for forming said power jet.

20. A fluid dynamic control device comprising:
a housing;
a blower rotatably mounted in said housing;
channel means provided in said housing in fluid communication with said blower, said channel means including a discharge end forming exit orifice means, said blower supplying a fluid under pressure to said exit orifice means when energized, said channel means and said exit orifice means being adapted to convert the fluid flow from said blower into a plane stream having a laminar flow;
first boundary means mounted in said housing downstream of said exit orifice means, said first boundary means including a laterally adjacent portion lying laterally adjacent one side of said stream;
separating means mounted in said housing adjacent to and upstream of said first boundary means for creating a pressure gradient across said stream in a direction to deflect it on to said first boundary means;
second boundary means mounted in said housing downstream of said first laterally adjacent portion, said second boundary means having a second laterally adjacent portion which lies laterally adjacent the other side of the said stream;
resonator means mounted in said housing in fluid communication with said separating means between said second laterally adjacent portion and said exit orifice means; and
sound means for creating a sound disturbance to drive said resonator means into resonance to disturb said stream in such a manner that the ambient pressure adjacent said second boundary means is reduced whereby the direction of said pressure gradient is reversed across said stream to switch said stream from said first boundary means to said second boundary means.

21. A device as defined in claim 20 wherein said stream returns to said first boundary means when said disturbance is removed.

22. A device as defined in claim 20 including vane means mounted in said housing downstream of said boundary means in the path of flow of said stream when it is flowing along one of said boundary means for actuation thereby.

23. A device as defined in claim 22 wherein said vane means is mounted in the path of flow of said fluid stream for actuation thereby when said fluid stream is flowing along either of said boundary means.

24. A device as defined in claim 22 including electrical contact means connected to said vane means for actuation thereby.

25. A device as defined in claim 20 including acoustical filter means mounted in said housing in communication with said channel means for attenuating the sound from said blower in a frequency band near the resonant frequency of said resonator means.

26. Apparatus for controlling the direction of movement of a vehicle, comprising:
a housing;
blower means rotatably mounted in said housing means for generating a fluid stream;
first fluid stream forming means provided in said housing in communication with said blower means for forming a first plane stream having a laminar flow;
first boundary means mounted in said housing downstream of said fluid stream forming means laterally adjacent one side of said first plane stream;
second boundary means mounted in said housing laterally adjacent the other side of said first plane stream, said second boundary means being generally opposite and downstream of said first boundary means;
first separating means mounted in said housing adjacent to and upstream of said first boundary means for creating a first pressure gradient across said first stream in a direction to deflect it onto said first boundary means, said first plane stream traveling along said first boundary means and exiting from said housing into ambient atmosphere, whereby said first plane stream exerts thrust against said housing means from a first direction when it is in position on said first boundary means;
first vibratory means for directing a vibratory flow of fluid at said first plane stream adjacent said first separating means for creating a first disturbance to disturb said first stream in such a manner that the ambient pressure adjacent said second boundary means is reduced whereby the direction of said first pressure gradient is reversed across said first stream to switch said first stream from said first boundary means to said second boundary means, whereby said first plane stream exits from said housing into the atmosphere and exerts thrust against said housing in a second direction when it is flowing along said second boundary means;
second fluid stream forming means provided in said housing in communication with said blower means for forming a second plane stream having a laminar flow;
third boundary means mounted in said housing means laterally adjacent one side of said second plane stream;
fourth boundary means mounted in said housing means laterally adjacent the other side of said second plane stream, said fourth boundary means being generally opposite and downstream of said third boundary means, whereby said second plane stream discharges between said boundary means into the ambient atmosphere outside said housing;
second separating means mounted in said housing adjacent to and upstream of said third boundary means for creating a second pressure gradient across said second plane stream in a direction to deflect it onto said third boundary means; and
second vibratory means for directing a vibratory flow of fluid at said second plane stream adjacent said second separating means for creating a second disturbance to disturb said second stream in such a manner that the ambient pressure adjacent said fourth boundary means is reduced whereby the direction of said second pressure gradient is reversed across said second plane stream to switch said second plane stream from said third boundary means to said fourth boundary means, said second plane stream exerting thrust against said housing means in a third direction when it is flowing along said third boundary means, said second plane stream exerting thrust against said housing means along a fourth direction when it is flowing along said fourth boundary means.

27. An apparatus as defined in claim 26 wherein said first and second streams return to said first and third boundary means, respectively, when said first and second disturbances, respectively, are removed.

28. An apparatus as defined in claim 26 including first resonator means in communication with said first stream and generally opposite said first separating means, said first resonator being driven into resonance by said first vibratory means;

and including second resonator means in communication with said second stream and generally opposite said second separating means, said second resonator being driven into resonance by said second vibratory means; said first and second vibratory means having different frequencies.

29. An apparatus defined in claim 26 wherein said first plane stream discharges from one end of said housing and said second plane stream discharges from another end thereof.

30. An apparatus as defined in claim 26 wherein the force which is exerted on said housing by said first and second plane streams lies substantially at right angles to each other when said plane streams are flowing along predetermined boundary means.

31. A thrust vectoring device for controlling the direction of movement of a vehicle, comprising:

a housing means;

power jet supply means provided in said housing means for supplying a power jet to impart thrust to said device, said power jet supply means including a first exit nozzle;

first boundary means mounted in said housing means laterally adjacent said power jet downstream of said first exit nozzle;

control jet supply means provided in said housing means for supplying a control jet to control said power jet, said control jet supplying means including a second exit nozzle;

second boundary means mounted in said housing means laterally adjacent one side of said control jet downstream of said second exit nozzle for directing said control jet into the path of flow of said power jet when said control jet is attached to said second boundary means, said second boundary means being mounted in said housing means between said power jet and said first boundary means;

separating means provided in said housing means between said secondary boundary means and said second nozzle for normally maintaining said control jet attached to said second boundary means, whereby said control jet maintains said power jet out of engagement with said first boundary means;

third boundary means mounted in said housing means laterally adjacent the other side of said control jet downstream of said second nozzle; and vibratory means for creating a disturbance by directing a vibratory flow of fluid at said control jet to disturb said control jet so that it switches from said second boundary means to said third boundary means, whereby said power jet becomes attached to said first boundary means to change the direction of thrust imparted to said device by said power jet.

32. A device as defined in claim 31 wherein said control jet returns to said second boundary means when said disturbance is removed.

33. A device as defined in claim 31 wherein said vibratory means includes a resonator mounted in said housing in communication with said separating means, said second boundary means and said third boundary means.

34. In combination with a device deriving thrust from the expulsion of mass by a jet stream providing a force and an associated couple applied at the center of mass of said device along a first line of action, thrust vectoring means comprising:

boundary means laterally adjacent said jet stream for defining a second line of action, whereby the direction and magnitude of said couple may be changed by causing said jet stream to switch from said first line of action to said second line of action; and means for switching said jet stream from said first line of action to said boundary means, said switching means including:

separating means adjacent to and upstream of said boundary means for creating a pressure gradient across said jet stream in a direction to deflect it away from said boundary means; and vibratory means for directing a vibratory flow of fluid at said jet stream adjacent said separating means to disturb said jet stream in such a manner that the pressure adjacent said boundary means is reduced, whereby the direction of said pressure gradient is reversed across said jet stream to switch said jet stream from said first line of action to said second line of action along said boundary means.

35. A combination as defined in claim 34 wherein said jet stream returns to said first line of action when said vibratory flow of fluid is removed.

36. A combination as defined in claim 34 wherein said switching means also includes resonator means in communication with said jet stream generally opposite said separating means, said resonator means being driven into resonance by said vibratory means.

37. In combination with a device deriving thrust from the expulsion of mass by a first jet stream discharging from said device along a first set line of action through the center of mass of said device, thrust vectoring means, comprising:

first fluid-stream forming means for forming a second jet stream;

first boundary means laterally adjacent one side of said second jet stream, said first boundary means defining a second set line of action through said center of mass when said second jet stream is attached thereto;

second boundary means laterally adjacent the other side of said second jet stream, said second boundary means being generally opposite and downstream of said first boundary means for directing said second jet stream into the path of flow of said first jet stream when said second jet stream is attached to said second boundary means;

first separating means adjacent to and upstream of said first boundary means for creating a first pressure gradient across said second jet stream in a direction to deflect it onto said first boundary means;

first vibratory means for directing a first vibratory flow of fluid at said second jet stream adjacent said first separating means to disturb said second jet stream in such a manner that the pressure adjacent said second boundary means is reduced whereby the direction of said first pressure gradient is reversed across said second jet stream to switch it from said first boundary means to said second boundary means, whereby said second line of action is established through said center of mass;

second fluid-stream-forming means for forming a third jet stream;

third boundary means laterally adjacent one side of said third jet stream, said third boundary means defining a third set line of action through said center of mass when said third jet stream is attached thereto;

fourth boundary means laterally adjacent the other side of said third jet stream, said fourth boundary means being generally opposite and downstream of said third boundary means for directing said third jet stream into the path of flow of said first jet stream when said third jet stream is attached to said fourth boundary means;

second separating means adjacent to and upstream of said third boundary means for creating a second pressure gradient across said third jet stream in a direction to deflect it onto said third boundary means; and second vibratory means for directing a second vibratory flow of fluid of said third jet stream adjacent said second separating means to disturb said third jet stream in such a manner that the pressure adjacent said fourth boundary means is reduced whereby the direction of said second pressure gradient is reversed across said third jet stream to switch it from said third boundary means to said fourth boundary means, whereby said third line of action is established through said center of mass.

38. A combination as defined in claim 37 wherein said second jet stream returns to said first boundary means when said first vibratory flow of fluid is removed and wherein said third jet stream returns to said third boundary means when said second vibratory flow of fluid is removed.

39. A combination as defined in claim 37 including first resonator means in communication with said second jet stream generally opposite said first separating means, said first resonator means being driven into resonance by said first vibratory means and second resonator means in communication with said third jet stream generally opposite said second separating means, said second resonator means being driven into resonance by said second vibratory means.

40. A combination as defined in claim 37 wherein said first and second separating means comprise first and second resonator means, respectively.

41. In combination with an air cushion vehicle having a curtain jet discharging through peripheral nozzle means around the circumference of said vehicle for deflection from a surface to effect a thrust in a predetermined direction, flight control means comprising:

boundary means laterally adjacent a predetermined portion of said curtain jet for deflecting said predetermined portion of said curtain jet away from said surface when said predetermined portion is attached to said boundary means, whereby a low pressure area is created on said surface to effect a thrust in a second predetermined direction; and means for switching said predetermined portion of said curtain jet from said surface onto said boundary means, said switching means including:

separating means adjacent to and upstream of said boundary means for creating a pressure gradient across said predetermined portion of said curtain jet in a direction to deflect it away from said boundary means and onto said surface; and vibratory means for directing a vibratory flow of fluid at said predetermined portion of said curtain jet adjacent said separating means to disturb said predetermined portion in such a manner that the pressure adjacent said boundary means is reduced, whereby the direction of said pressure gradient is reversed across said predetermined portion to switch it from said surface to said boundary means.

42. A combination as defined in claim 41 wherein said predetermined portion of said curtain jet returns to being deflected from said surface when said vibratory flow is removed.

43. A combination as defined in claim 41 wherein said switching means also includes resonator means in communication with said predetermined portion of said curtain jet generally opposite said separating means, said resonator means being driven into resonance by said vibratory means.

44. An air cushion vehicle adapted to be supported above a suitable surface comprising:

peripheral nozzle means encompassing said vehicle body member for forming a curtain jet passageway in communication with said surface;

power supply means in communication with said peripheral nozzle means for forming said curtain jet and directing it through said passageway onto said surface;

boundary means mounted in said body member laterally adjacent a segment of said curtain jet for deflecting said segment away from said surface when said segment is attached to said boundary means, whereby a low pressure area is created on said surface; and separating means adjacent to and upstream of said boundary means for creating a pressure gradient across said predetermined portion of said curtain jet in a direction to deflect it away from said boundary means and onto said surface; and vibratory means for directing a vibratory flow of fluid at said segment adjacent said separating means to disturb said segment in such a manner that the pressure adjacent said boundary means is reduced, whereby the direction of said pressure gradient is reversed across said segment to switch it from said surface to said boundary means.

References Cited by the Examiner

UNITED STATES PATENTS

| | | | |
|---|---|---|---|
| 3,122,062 | 2/1964 | Spivak et al. | 137—81.5 X |
| 3,143,856 | 8/1964 | Hausmann | 60–35.54 |
| 3,144,037 | 8/1964 | Cargill et al. | 137—81.5 |
| 3,204,405 | 9/1965 | Warren et al. | 60—35.54 |
| 3,241,627 | 3/1966 | Hart et al. | 180—7 |

MARK NEWMAN, *Primary Examiner.*

C. R. CROYLE, *Assistant Examiner.*